Aug. 1, 1961     A. L. JENNY ET AL     2,994,809

ELECTROLYTIC CAPACITOR

Filed May 20, 1960

*INVENTORS,*
ALFRED L. JENNY
BY  DONALD H. STEPHENSON

Harry M. Saragovitz
ATTORNEY

United States Patent Office 2,994,809
Patented Aug. 1, 1961

2,994,809
ELECTROLYTIC CAPACITOR
Alfred L. Jenny, Columbia, S.C., and Donald H. Stephenson, Bennington, Vt., assignors to the United States of America as represented by the Secretary of the Army
Filed May 20, 1960, Ser. No. 30,693
1 Claim. (Cl. 317—230)

The present invention relates to electrolytic capacitors, and more particularly to an improved fill electrolyte therefor.

It is an object of the present invention to provide a capacitor having a high degree of stability and improved life characteristics when operated at high voltages and over a wide range of temperature.

It is another object of the invention to provide an electrolyitic capacitor which is operable over a temperature range of about −55° C. to 125° C. and having minimum change in capacitance and resistivity over that range.

It is a further object of the invention to provide a non-aqueous fill electrolyte which confers the above improved characteristics to electrolytic capacitors.

This and other objects of the invention are achieved in an electrolytic capacitor which comprises an electrode of a film-forming metal and an electrolyte consisting essentially of a mixture of N,N-dimethyl formamide, N-methylacetamide and an ionogen such as ammonium borate, dissolved therein.

Figure 1:
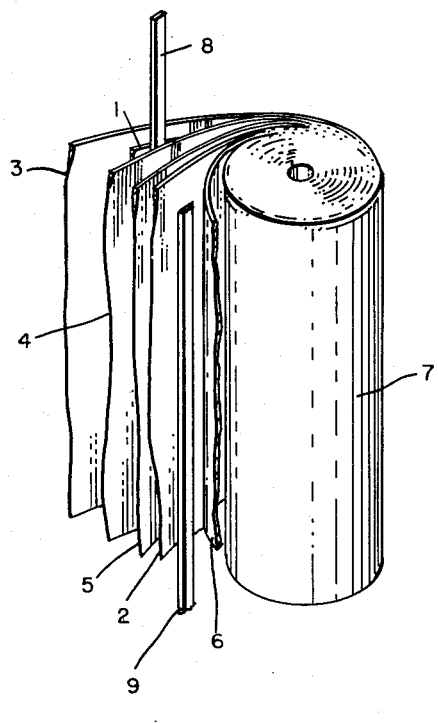
Figure 2:
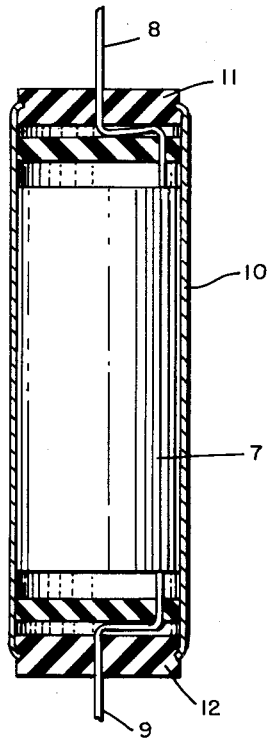

The invention will be better understood from the following description taken in conjunction with the accompanying drawing, in which:

FIG. 1 shows an electrolytic capacitor roll of a type to which the present invention is applicable; and FIG. 2 shows a capacitor assembly with the roll body of FIG. 1 inclosed in a casing.

Referring now to the drawing, there is shown in FIG. 1 a partially unrolled capacitor roll body having electrode foils 1 and 2 at least one of which is made of tantalum or other suitable film-forming metal, and being advantageously, though not necessarily, etched and having a dielectric oxide film formed thereon in accordance with known practices. Spacer strips 3, 4, 5 and 6 composed of paper or other porous material are arranged separating electrode foils 1 and 2, and the electrodes and spacers are all wound into a compact roll 7 suitable for impregnation with the electrolyte of the present invention, the roll being impregnated with the electrolyte before or after insertion into a casing or other container, as is well known in the art. Terminals or tap straps 8 and 9 of opposite polarity are respectively fixed in contact with the electrodes 1 and 2 and serve as capacitor terminals.

FIG. 2 shows a capacitor in which the rolled capacitor body is assembled in a casing 10 with terminals 8 and 9 extending respectively through plugs or closures 11 and 12 of insulating material which serve to seal off the opposite ends of casing 10.

The electrolyte of the present invention consists principally of a mixture of N,N-dimethyl formamide, N-methylacetamide and a suitable ionogen dissolved therein to provide for the necessary conductivity in the electrolyte. Generally the ionogen will be present in extremely minute amounts, and ordinarily an amount of the ionogen is used which will not precipitate at −55° C. Within such limitation, higher concentrations of ionogen may be used for low voltage applications, whereas lower concentrations of ionogen may be used for higher voltage applications. A preferred ionogen for the present electrolyte is ammonium borate, e.g., ammonium pentaborate and ammonium tetraborate, particularly for higher voltage applications. However, the invention is not restricted to this particular ionogen, and other salts may be applied including other alkaline borates, and the alkyl (including ammonium) phosphates, oxalates, citrates, tartrates, succinates, nitrates, chlorides, dichromates, and acetates having good solubility characteristics in the mixture which according to the present invention consists of N,N-dimethyl formamide and N-methylacetamide.

A preferred example of an electrolyte according to the present invention is as follows (percent by weight):

| | Percent |
|---|---|
| N-methylacetamide | 17.4 |
| N,N-dimethylformamide | 82.2 |
| Ammonium pentaborate | .4 |

The resistivity of this electrolyte at 25° C. is 1350 (ohm-cm.).

The electrolyte according to the present invention is exceptionally stable and resistant under severe conditions of heat, light and chemical change and has a considerably lower freezing point than conventional fill electrolytes. It shows very little change in viscosity with widely varying temperatures as well as minimum resistivity change and capacitance change with temperature. It is adapted for higher voltage conditions than heretofore normally used electrolytes and thus makes possible the use of single section high voltage units instead of the series-connected low voltage units previously used.

It will be obvious to those skilled in the art that various modifications and variations may be made without departing from the scope of the invention as defined in the appended claim.

What is claimed is:

An electrolytic capacitor essentially consisting of a pair of electrodes at least one of which is composed of a film-forming metal and an electrolyte consisting essentially in percent by weight of 82.2% of N,N-dimethyl formamide, 17.4% of N-methylacetamide and 0.4% of ammonium pentaborate, the resistivity of this electrolyte at 25° C. being 1350 ohms per centimeter.

References Cited in the file of this patent

UNITED STATES PATENTS

| 2,505,180 | Georgiev et al. | Apr. 25, 1950 |
| 2,801,221 | Robinson | July 30, 1957 |

OTHER REFERENCES

Solvents etc., Dawson et al., J. Amer. Chem. Soc., vol. 79, April–June 1957, pages 3004–3006.